US007606144B2

United States Patent
Chen et al.

(10) Patent No.: US 7,606,144 B2
(45) Date of Patent: Oct. 20, 2009

(54) RING-CONNECTED SURVEILLANCE SYSTEM WITH REAL-TIME BACKUP MONITORING

(75) Inventors: Lung-Tan Chen, Taichung (TW); Guo Ming Huang, Yunlin County (TW)

(73) Assignee: Penton Media Technologies Co., Ltd., Taichung (TW)

( * ) Notice: Subject to any disclaimer, the term of this patent is extended or adjusted under 35 U.S.C. 154(b) by 621 days.

(21) Appl. No.: 11/387,915

(22) Filed: Mar. 24, 2006

(65) Prior Publication Data

US 2007/0171837 A1    Jul. 26, 2007

(30) Foreign Application Priority Data

Jan. 23, 2006    (TW)    ............... 95102462 A (51) Int. Cl.
*H04L 1/00*    (2006.01)
(52) U.S. Cl. .................. 370/222; 370/395.52; 370/403; 370/406
(58) Field of Classification Search ........................ None
See application file for complete search history.

(56) References Cited

U.S. PATENT DOCUMENTS

| | | | | |
|---|---|---|---|---|
| 4,726,018 A | * | 2/1988 | Bux et al. .................... | 370/455 |
| 5,119,373 A | * | 6/1992 | Fredricsson et al. ......... | 370/458 |
| 6,008,867 A | * | 12/1999 | Cooper et al. ................ | 348/705 |
| 6,766,482 B1 | * | 7/2004 | Yip et al. ..................... | 714/717 |
| 7,046,621 B2 | * | 5/2006 | Wang et al. .................. | 370/222 |
| 7,089,333 B2 | * | 8/2006 | Marinescu et al. .......... | 709/248 |
| 7,289,496 B2 | * | 10/2007 | Donoghue et al. .......... | 370/386 |
| 7,433,302 B2 | * | 10/2008 | Allen .......................... | 370/224 |

* cited by examiner

*Primary Examiner*—Frank Duong
(74) *Attorney, Agent, or Firm*—Muncy, Geissler, Olds & Lowe, PLLC (57) ABSTRACT

A real-time ring-loop surveillance network system is provided. By using digital communication network, multiple channels of media data and control data are transmitted in a ring-loop. The media data includes any forms of digital audio and video data, which is transmitted through 802.3/802.3u physical layer interface. The media data reaches all the stations in the network at the same time, and the number of the stations in the system depends on the system requirements. The number of the channels depends on the transceiver's speed. The present invention defines frames to encompass the media data and control data for transmission. The point-to-point delay is less than 0.15 ms. When 32 stations are connected in a ring-loop, the maximum delay is less than 5 ms. A backup mechanism is also included to detect and automatically switch to maintain the normal operation of the surveillance network system. The monitor signals are also encompassed in frames transmitted in the same network.

4 Claims, 8 Drawing Sheets

RING-CONNECTED SURVEILLANCE SYSTEM WITH REAL-TIME BACKUP MONITORING

FIELD OF THE INVENTION

The present invention generally relates to a surveillance system, and more specifically to a ring-connected surveillance system with real-time backup monitoring.

BACKGROUND OF THE INVENTION

The surveillance system is widely used in various applications, such as fire detection, police surveillance, coast surveillance, environmental protection, military surveillance, aero-traffic, medical service, and various public safety situations. The modem surveillance system incorporates computers, communication, and satellites to provide a close surveillance and protection. As the price of the hardware reduces in recent years, the surveillance system is also adopted in more business settings, offices, and households. For example, the surveillance system can be set up to monitor the safe, business venue, warehouse, high-priced goods, production line, and so on. The surveillance system can even be set up in the neighborhood to prevent theft, burglary, vandalism, or littering.

Figure 1:
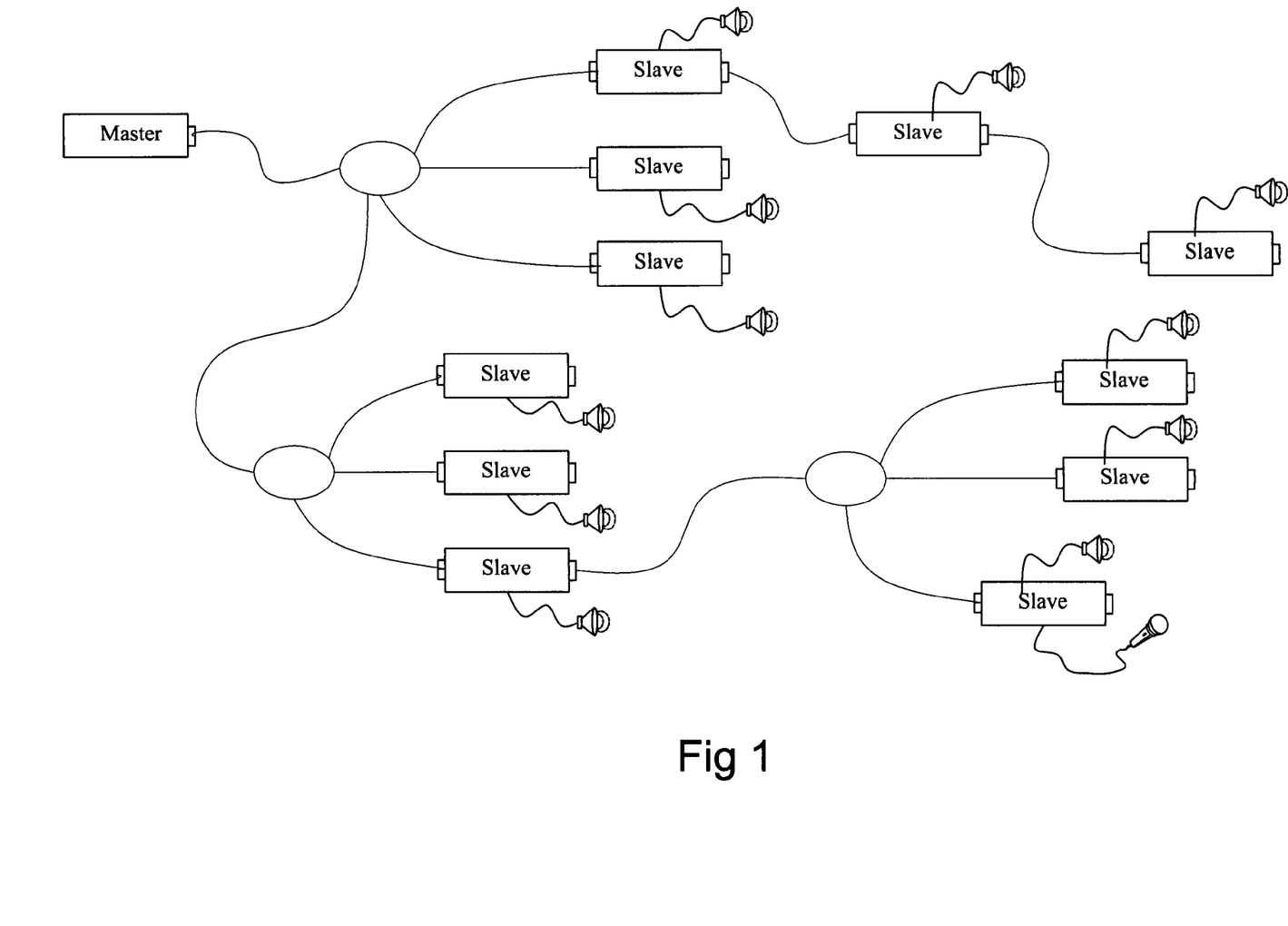
FIG. 1 shows a schematic view of a conventional surveillance system.

However, most of the conventional surveillance systems use a chain-connected or star-connected master/slave structure. For example, U.S. Patent Application Publication 2003/0050989 A1 disclosed an audio data transmission system using a digital communication network, such as Ethernet, to connect a master module and a plurality of slave modules in a chain or a star topology, as shown in FIG. 1. Although this type of topology allows data transmission and system monitoring, it lacks in fault-tolerance. Once a communication segment between two stations is out of order, the communication between these two stations is cut off. Another drawback of such type of topology is that the communication delay is large, especially for the stations at the end of the communication chain. This also affects the system efficiency.

As the hardware price continues to decrease and the surveillance is more widely adopted in different venues, it is imperative to provide a more effective surveillance system to overcome the above drawbacks.

SUMMARY OF THE INVENTION

The present invention has been made to overcome the above-mentioned drawback of conventional surveillance systems that have long delay and no fault-tolerance. The primary object of the present invention is to provide a surveillance network system using a ring-loop digital communication network to transport multiple channels of media data and control signal. With the feature of the Ethernet, the media data and the control signal can be transceived. The data from one station can be transmitted through the transceiver of the Ethernet to the next station, and so on. The stations form a ring loop. Under the ring loop structure, a master/slave relation is formed, and the media data are synchronized on all the stations in the ring. The delay is so small that is it imperceptible to the human senses.

Another object of the present invention is to provide a surveillance network system with a real-time backup mechanism so that the network system can continue to operate normally even when one link in the ring loop is disconnected. In addition, the network system can provide a real-time warning regarding the disconnection so that the problem can be fixed. Through the backup monitor mechanism, the real-time detection of disconnection and the real-time switching are performed so that surveillance network system can switch to the backup transmission route when detecting a disconnected link, and automatically switch back to the original transmission route when the disconnected link is fixed.

To achieve the above objects, the present invention provides a real-time surveillance network system having a backup monitor mechanism and using a ring-loop communication network for accommodating the transmission of media data and control signal so that the surveillance network system can switch to the backup transmission route too continue normal operation when a disconnected link in the ring-loop is detected. The real-time surveillance network system includes a ring-loop of cables, such as CAT5, CAT6, or optic fiber, connecting a plurality of surveillance stations. The ring-loop consists of a plurality of point-to-point segments, and each segment is made of a cable connecting two surveillance stations. To improve the fault-tolerance and the transmission efficiency, the present invention uses a dual-ring structure to provide the bi-directional transmission capability between neighboring stations. To enable the point-to-point error surveillance, the present invention also includes a backup monitor mechanism to monitor the operation between two neighboring stations, and the system can switch the transmission direction when an error or disconnection is detected in any segment linking two stations. In this manner, the present invention can be warned and continue normal operation when a disconnected link is detected.

The present invention is applicable to airport, shopping malls, subway system, football stadium, school campus, or other large area that require to transceiver a large amount of data over a long distance for real-time playing.

The foregoing and other objects, features, aspects and advantages of the present invention will become better understood from a careful reading of a detailed description provided herein below with appropriate reference to the accompanying drawings.

BRIEF DESCRIPTION OF THE DRAWINGS

The present invention can be understood in more detail by reading the subsequent detailed description in conjunction with the examples and references made to the accompanying drawings, wherein.

DETAILED DESCRIPTION OF THE PREFERRED EMBODIMENTS

Figure 2:
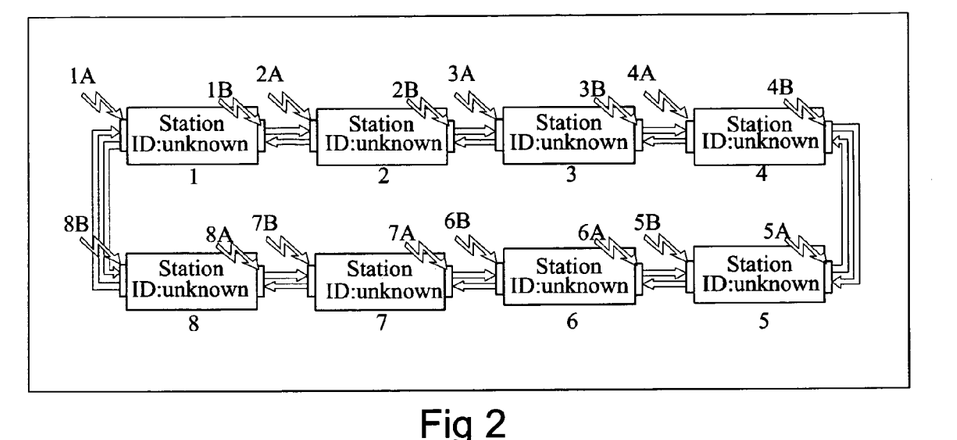
FIG. 2 shows a schematic view of an embodiment of the real-time surveillance network system of the present invention.

FIG. 2 shows a schematic view of an embodiment of a real-time surveillance network system of the present invention. The embodiment includes 8 stations. FIG. 2 shows the 8 stations are connected in a ring-loop, while the ID of the stations is yet determined. At this point, the backup monitor mechanism on each station checks the connection with the neighboring stations. For example, the second station checks the connection with the first and the third station. All the connections can be monitored through the console of each station or the PC connecting to the surveillance network.

Figure 3:
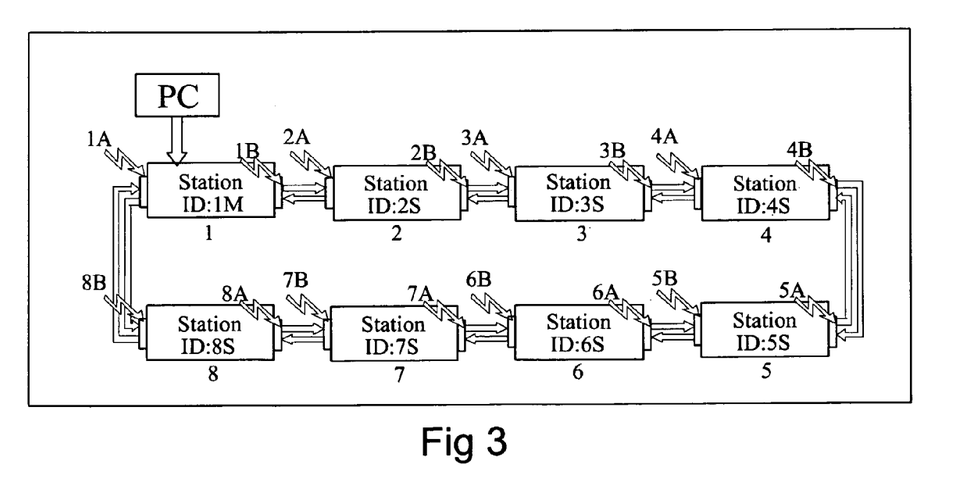
FIG. 3 shows a schematic view after ID assigned to the stations of the embodiment in FIG. 1.

FIG. 3 shows a schematic view of the embodiment of FIG. 2 after the control software on the PC assigns the ID to each station in the network system. For example, if the PC is connected to the first station, and the each station is assigned an ID in an increasing order successively, the resulted ID assignment will be as shown in FIG. 3. After assign the first station as station 1, the ID assignment starts from 1B transmits to 2A, and assigns the second station as station 2, and proceeds from 2B to 3A, and so on. After the ID assignment, the station with the smallest ID number will be selected as the master, and the remaining stations are slaves, as shown in FIG. 3, station 1 is the master, and stations 2-8 are slaves.

Figure 4:
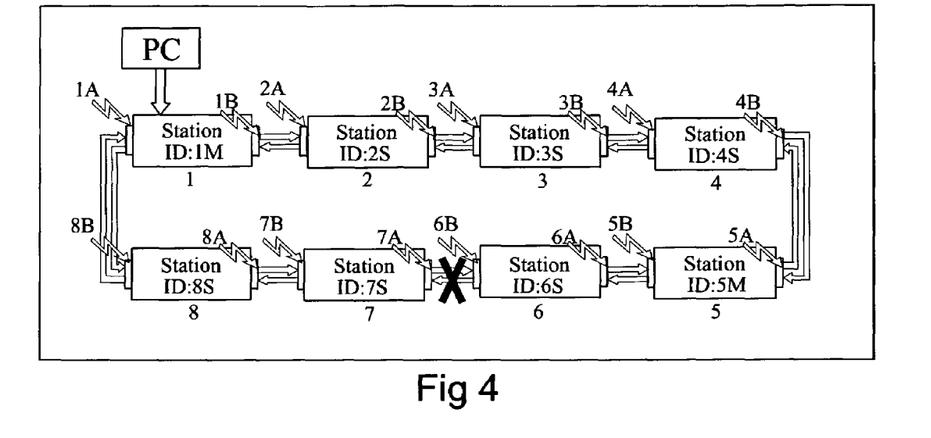
FIG. 4 shows a disconnected link in the embodiment in FIG. 3.

FIG. 4 shows a disconnected link is detected in the embodiment of FIG. 2 after a long duration of operation. As shown in FIG. 4, the segment linking 6B and 7A is disconnected. Through the backup monitor mechanism, station 6 is assigned as a start station, and station 7 is assigned as a stop station. The remaining stations 1, 2, 3, 4, 5, 8, are all assigned as bypass stations. A single disconnected link will not render the network system malfunction. The present invention can tolerate a single point error by re-directing the transmission direction so that the surveillance network system can continue to operate normally. For example, the media data and the control signal from station 6 to station 7 will be routed through stations 5, 4, 3, 2, 1, 8 so that the transmission can continue. However, only the carry frames will be re-directed for the transmission, the monitor frames are still transmitted using the original direction to detect whether the error on the link is fixed. The carry frames and the monitor frames will be explained later in the description. When the link between 6B and 7A is fixed, the surveillance network system will switch back to its original routing direction, marked as no backup state. Therefore, no stations are assigned as start station, stop station, or bypass station after the link 6B to 7A is fixed, which is the same as before the error occurred in the link 6B-7A.

Figure 5:
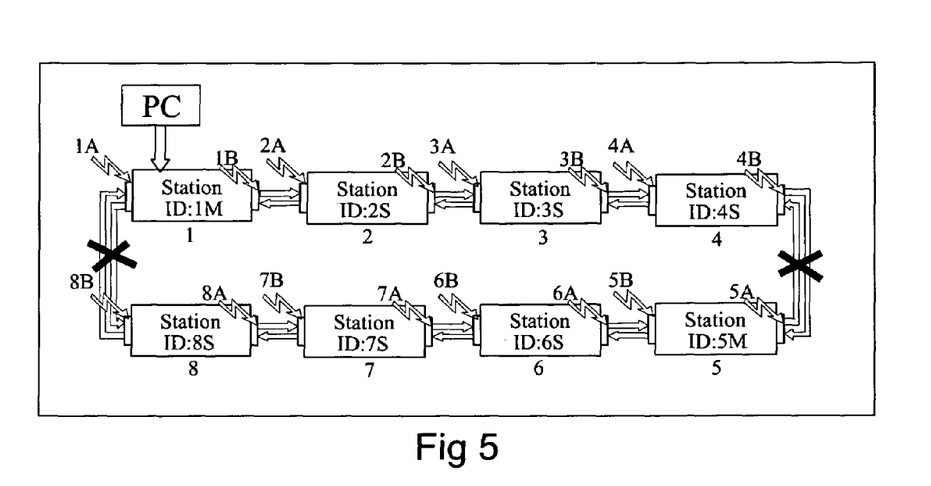
FIG. 5 shows two disconnected links in the embodiment in FIG. 3.

FIG. 5 shows two disconnected links are detected in the embodiment of FIG. 2 after a long duration of operation. As shown in FIG. 5, the segment linking 4B and 5A and the segment linking 8B and 1A are both disconnected. Through the backup monitor mechanism, station 4 is assigned as a start station, and station 1 is assigned as a stop station. Stations 2, 3 are assigned as bypass stations. Stations 1, 2, 3, 4 will form a local network. Station 5 will be assigned as the master of another local network because station 5 has the smallest ID number in the local network. Station 5 is also the stop station, and station 8 is the start station. Stations 6, 7 are assigned as bypass stations. As there are two disconnected links, two local networks are formed. If there are more disconnected links, more separated local networks will be formed. Within each local network, the station with a smallest ID number is the master of the local network. When a disconnected link is fixed, for example, link 4B-5A, the two local networks will be merged, and station 5 will be assigned as slave again. In this case, station 1 is the stop station, station 8 is the start station, and the remaining stations 2, 3, 4, 5, 6, 7 are all assigned as bypass stations, which is similar to the embodiment in FIG. 4 with one disconnected link.

Figure 6:
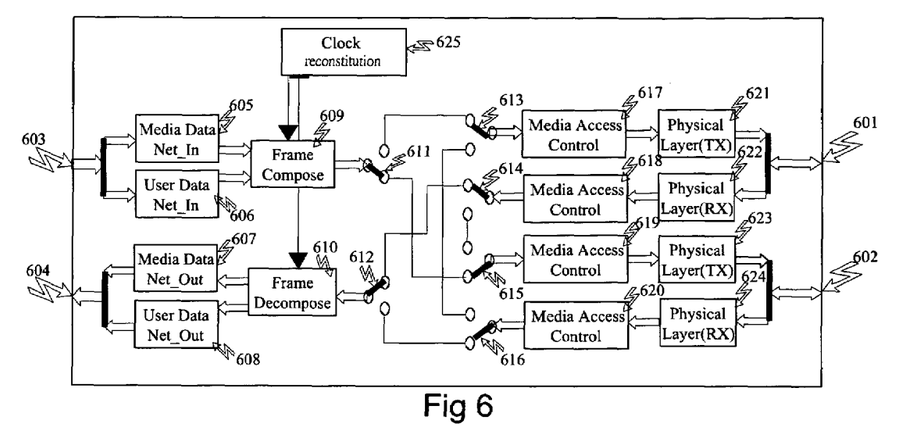
FIG. 6 shows a schematic view of the network card of a station according to the present invention.

FIG. 6 shows a schematic view of a network card, including physical layer transmission connection points (Port A, Port B) 601, 602, digital media and control data input 603, digital media and control data output 604, digital media data transmission management 605, control data transmission management 606, digital media data receiving management 607, control data receiving management 608, frame compose management 609, frame decompose management 610, output frame management 611, receiving frame management 612, frame source output selections 613, 615, frame input destination selections 614, 616, transmitting media 617, 619, receiving media 618, 620, physical layer transmitting interfaces 621, 623, physical layer receiving interfaces 622, 624, and clock reconstitution module 625. The master/slave assignment determines which clock will be used, which is also the synchronization mechanism of the entire network system. If a station is a master, the station outputs its own clock. If a station is a slave, the station outputs the reconstituted clock.

Figure 7:
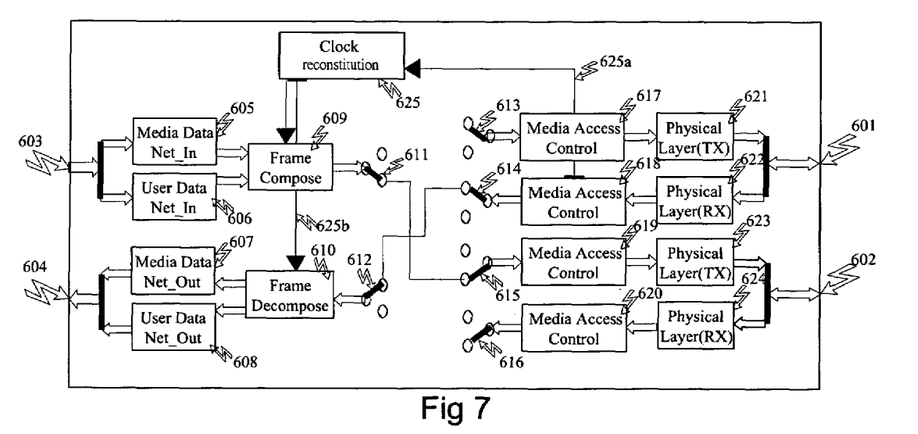
FIG. 7 shows a schematic view of the operation of the network card of FIG. 6 when no backup situation occurring.

FIG. 7 shows the operation of a network card in a no backup situation. When the system operates in a no backup situation, the digital media data and control data are transmitted at a fixed clock rate of 48 KHz to frame compose management 609, through output frame management 619, frame source output selection 615, transmitting media 619, to physical layer transmitting interface 623 for transmitting. On the other hand, the frames are received by physical layer receiving interface 622, through receiving media 618, frame input destination selection 614, receiving frame management 612, to frame decompose management 610 for decomposing into digital media data for digital media data receiving management 606 and control data for control data receiving management 608. Therefore, when operating in a no backup situation, the communication flows in from physical layer transmission connection point 601, and out from physical layer transmission connection point 602. If a station is a master, clock 625a to clock reconstitution module 625 is not for adjustment reference. Clocks 625b, 625c are generated by clock reconstitution module 625. If a station is a slave, clock 625a to clock reconstitution module 625 is for adjustment reference, and clocks are the clocks after the adjustment and are synchronized with the 48 KHz of the master.

Figure 8:
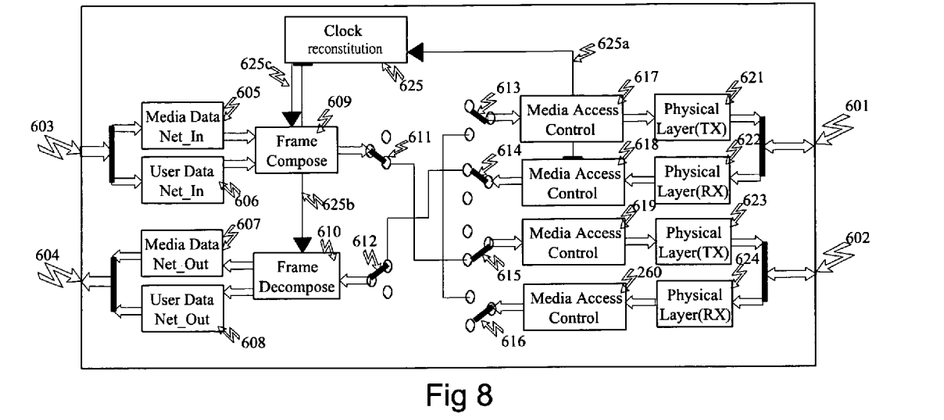
FIG. 8 shows a schematic view of the operation of the network card of FIG. 6 when the network card used as a bypass station in the backup situation.

FIG. 8 shows the operation of the network card when a station is assigned as a bypass station. When the system detects a disconnected link, a backup situation occurs. When a station is assigned as a bypass station, the receiving flow does not change direction, while a new transmitting direction is added. The frames are received by physical layer transmission connection point 602, through physical layer receiving interface 624, through receiving media 620, frame input destination selection 616, to frame source output selection 613, and transferred through transmitting media 617 to physical layer transmitting interface 621. Basically, the bypass station maintains the same original receiving direction, and the other frames entering from the other direction is, instead of sending to frame decompose management 610 for decomposition, transmitted to transmitting interface 617 for transmission. The clock of the station depends on whether it is a master or a slave. The adjustment pulse of the clock of the bypass station is from receiving media 618.

Figure 9:
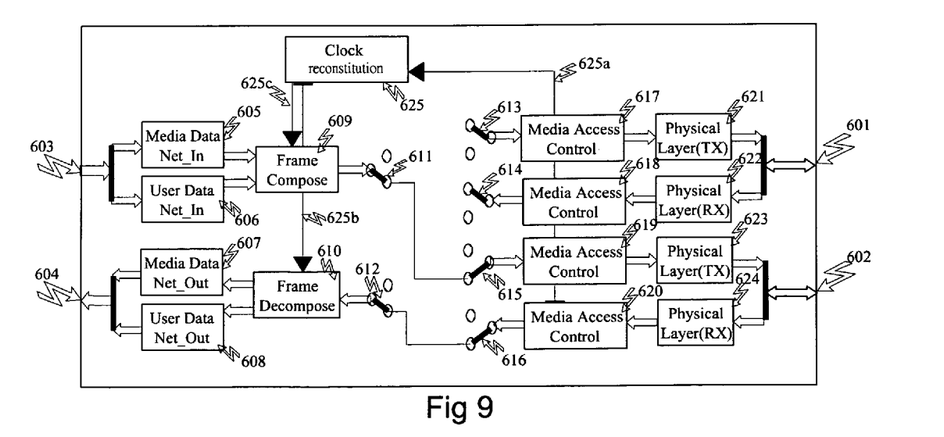
FIG. 9 shows a schematic view of the operation of the network card of FIG. 6 when the network card used as a stop station in the backup situation.

FIG. 9 shows the operation of the network card when a station is assigned as a stop station. When a backup situation occurs and a station is assigned as a stop station, the transmitting flow does not change direction, while receiving direction is changed. The frames enter physical layer transmission connection point 602, through physical layer receiving interface 624, through receiving media 620, frame input destination selection 616, to receiving frame management 612, and transferred to frame decompose management 610 for decomposition. The decomposed digital media data is placed into digital media data receiving management 607 with the same original transmission direction. The clock of the station depends on whether it is a master or a slave. The adjustment pulse of the clock of the bypass station is from receiving media 620.

Figure 10:
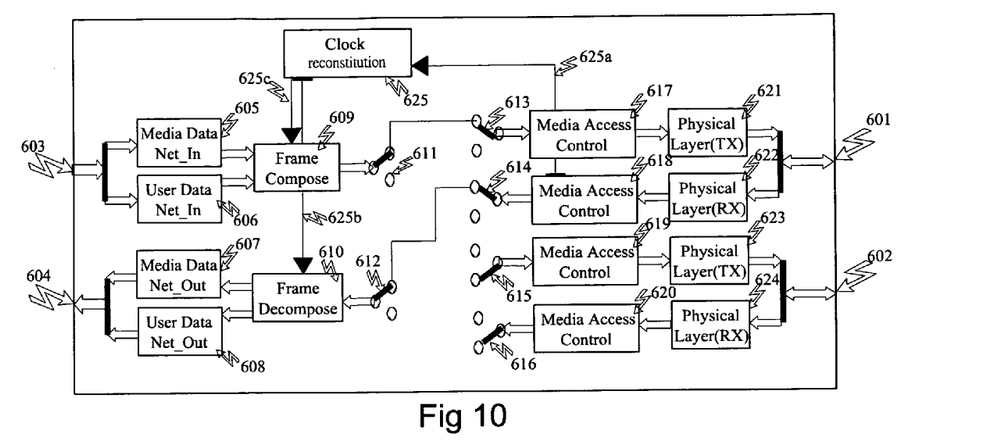
FIG. 10 shows a schematic view of the operation of the network card of FIG. 6 when the network card used as a start station in the backup situation.

FIG. 10 shows the operation of the network card when a station is assigned as a start station. When a backup situation occurs and a station is assigned as a start station, the receiving flow does not change direction, while transmitting direction is changed. The frames are sent from frame compose management 609, through output frame management 611, frame source output selection 613, transmitting media 617, to physical layer transmitting interface 621, and reach physical layer transmission connection point 601 for transmitting. The received frames enter through physical layer transmission connection point 601, through physical layer receiving interface 622, through receiving media 618, frame input destination selection 614, to receiving frame management 612, and transferred to frame decompose management 610 for decomposition. The clock of the station depends on whether it is a master or a slave. The adjustment pulse of the clock of the bypass station is from receiving media 620.

Figure 11:
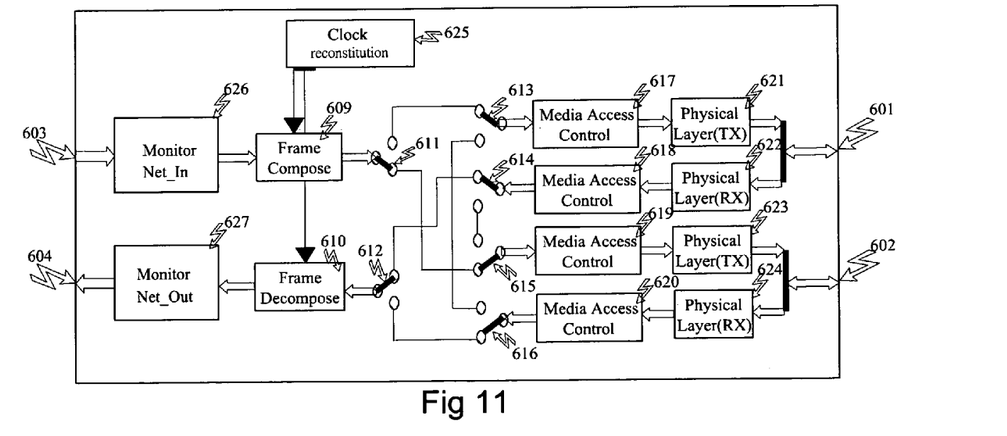
FIG. 11 shows a schematic view of the complete operation of the network card of FIG. 6.

FIG. 11 shows a complete operation of the network card of FIG. 6. In addition to the aforementioned carry frame which composing the frames, a monitor frame is also transmitted and received for monitoring the backup state, shown as monitor transmitting management 626, monitor receiving management 627 in FIG. 11. The monitor frames are sent from output frame management 611 to frame source output selection 613 or 615 for transmitting and received from receiving media 618 or 620, through frame input destination selections 614 or 616, to frame decompose management 610 for decomposition. The overall operation is clocked by clock reconstitution module 625, and therefore using the carry frame for clock adjustment. The adjusted clock is sent to frame compose 609, but also depends on whether the station is a master or a slave station.

Figure 12:
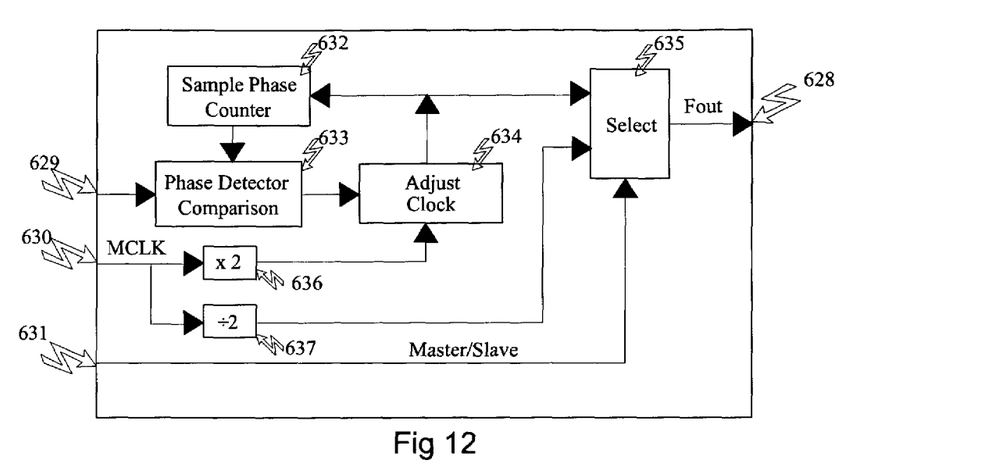
FIG. 12 shows a schematic view of an FPGA embodiment of the clock reconstitution module.

FIG. 12 shows an FPGA embodiment of the clock reconstitution module of the present invention, including an output 628, a receiving frame 629, an input 630, a state (master or slave) input 631, a sample phase counter 632, a phase detection comparison 633, an adjust clock 634, a selector 635, a frequency multiplier 636 and a frequency divider 637. Clock reconstitution module 625 is responsible for synchronization on the trigger by the received frame. As shown in FIG. 12, frame 629 triggers phase detection comparison 633, and phase detection comparison 633 samples the value in the sample phase counter 632 for comparison, and the comparison result is used by adjust clock 634 for adjusting the clock. Adjust clock 634 adjusts the clock according to the four times of the target frequency. The adjusted frequencies are used by selector 635 and sample phase counter 632. Depending on state input 631, the frequency for output 628 is selected. The frequency of input 630 is twice of that of output 628. The frequencies output from frequency multiplier 636 and frequency divider 736 are supplied to adjust clock 634 and selector 635.

Figure 13:
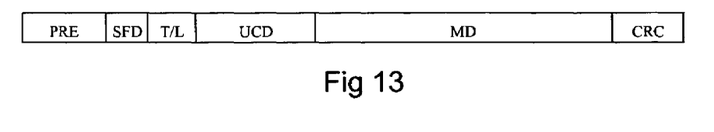
FIG. 13 shows a schematic view of a carry frame of the present invention.

FIG. 13 shows the carry frame, consisting of media data and control data, transmitted at the fixed 1/48 KHz. The carry frame is structured to include a PRE field for clock synchronization adjustment in the physical layer, an SFD field for the starting of the frame, a T/L field for the type and the length of the frame excluding the PRE, SFD and CRC fields, a UCD field for system control data, an MD for media data, and a CRC for the CRC value of the entire frame ranging from T/L field to MD field.

Figure 14:
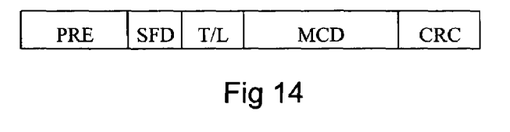
FIG. 14 shows a schematic view of a monitor frame of the present invention.

FIG. 14 shows the monitor frame, including detection control commands, transmitted at the fixed 48 KHz. The monitor frame is structured to include a PRE field for clock synchronization adjustment in the physical layer, an SFD field for the starting of the frame, a T/L field for the type and the length of the frame excluding the PRE, SFD and CRC fields, an MCD field for system monitor data, and a CRC for the CRC value of the entire frame ranging from T/L field to MD field.

Figure 15:
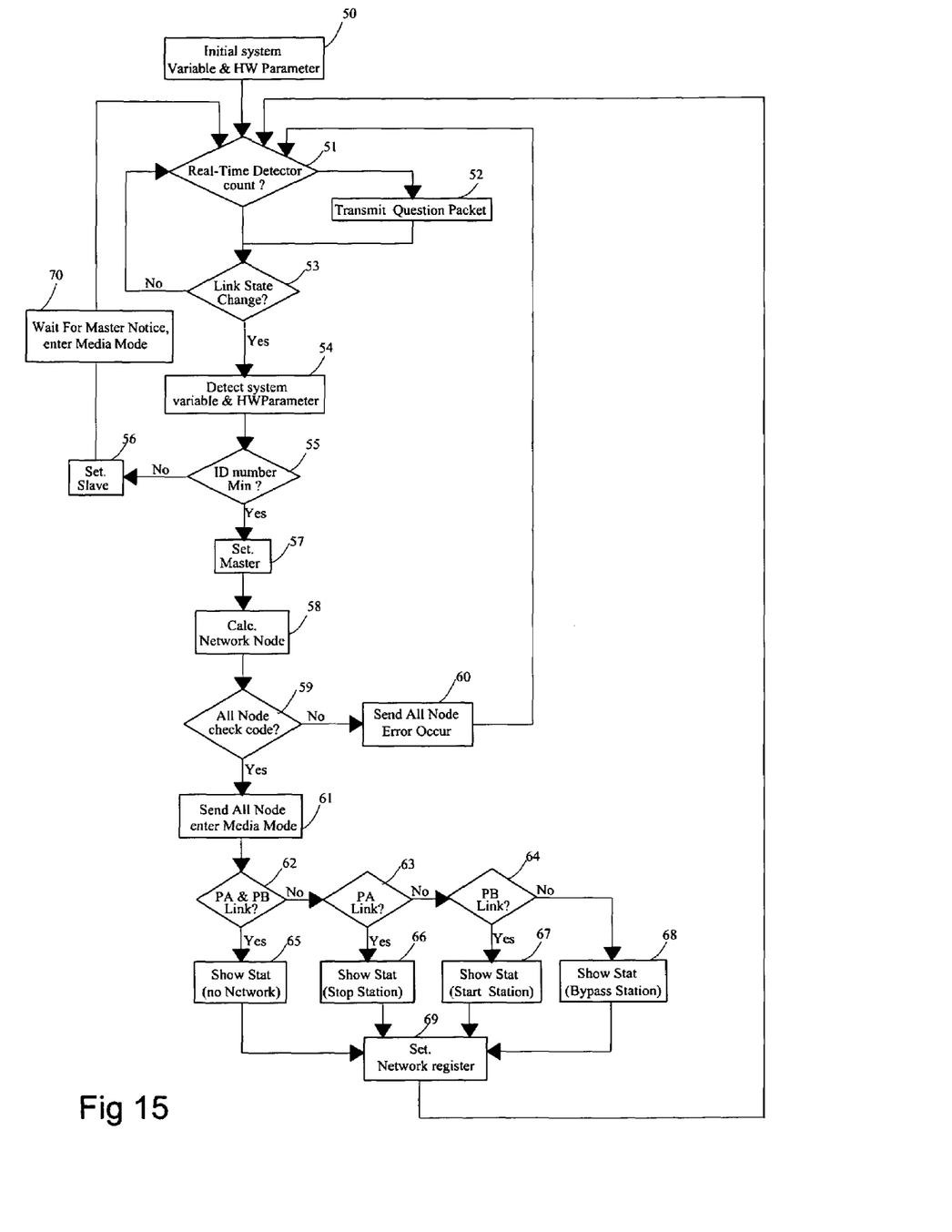
FIG. 15 shows a flowchart of a real-time surveillance network system of the present invention.

FIG. 15 shows a flowchart of the real-time surveillance network system of the present invention. The flowchart is executed by each station in the surveillance network system. When the system starts, it enters step 650 for initialization of system variables and hardware parameters. Step 651 is to check the state of the link at a fixed interval. At the end of the fixed interval, step 652 is executed to send the inquiry frame; otherwise, step 653 is executed to check the link state. If the state of the link is unchanged, step 651 will be executed repeatedly until the state changes, which leads to step 654 to check all the system variables. Step 655 is to check whether the ID of the station is the smallest number in the network. If so, step 657 is taken to set the station as the master; otherwise, step 656 is to set the station as a slave station. The slave station waits for the notification from the master station, enters the media mode (step 670), and then returns to step 651. After a station is set as a master station, the station takes step 658 to calculate the number of the stations in the network, and step 659 to determine whether all the check code of the stations are the same. If not, take step 660 to send an occur message to all the station; otherwise, take step 661 to send notification to all the stations to enter the media mode. Step 662 is to check whether both port A and port B are disconnected. If so, take step 665 to show the disconnection state; otherwise, take step 663 to check whether port A is disconnected. If so, take step 666 to set the station as a stop station; otherwise, take step 664 to check whether port B is disconnected. If so, take step 667 to set this station as a start station; otherwise set this station as a bypass station. Step 669 follows steps 665, 666, 667, 668 to set the network state register so that the network can switch to operate normally, and returns to step 651 for further monitoring. Step 670 is to wait for the notification from the master station and enters the media mode.

FIG. 15 shows that when a link is disconnected in the network system, the detection and the switch to activate the backup mechanism can be performed in real-time to achieve high efficiency.

It is worth noticing that the transmission media can be either UTP or optic fiber. If UTP is used, the transmission range can reach 100-150 meters. On the other hand, if a multimode optic fiber is used with the ST connector, the transmission range can be as high as 2000 meters.

Because the surveillance network system only uses the physical layer characteristics of the Ethernet, the frames can be defined to achieve the maximum transmission efficiency of the Ethernet. For example, if the audio data is 32-bit and the sampling rate is 48 KHz, forty-nine 32-bit channels with control and system monitor data can be accommodated in the network. In addition, the system can be controlled by PC software and backup monitor mechanism. In other words, the media and control data is placed inside the carry frame and the monitor signal is placed inside the monitor frame so that the two different types of frames can be transmitted within the same network.

Although the present invention has been described with reference to the preferred embodiments, it will be understood that the invention is not limited to the details described thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. A real-time surveillance network system, with a backup mechanism and able to switch communication transmission direction in real-time, comprising:
 a plurality of surveillance stations, further comprising a network card, said network card having a clock reconstitution module for providing clocks and using Ethernet physical layer for transmitting a carry frame and a monitor frame, both said carry frame and said monitor frame having a data field for clock synchronization adjustment in physical layer; and
 a plurality of transmission segments, each said segment connecting two said stations, each said segment further comprising two independent transmission lines, and all said segments forming a double-ring loop;
 wherein each said surveillance station being assigned an identification (ID) during initialization of said system, and said station with the smallest ID being assigned as a master station of said system and remaining said stations being assigned as slave stations, said carry frame containing media data and control data, said monitor frame containing data regarding state of each said segment, said station switching transmission direction upon detecting said monitor frame indicating a disconnection in said segment,
 wherein said carry frame further comprises:
  a preamble (PRE) field, for clock synchronization adjustment in said physical layer;
  a start of frame delimiter (SFD) field for the starting of said frame;
  a type/length (T/L) field for the type and the length of said frame excluding the PRE, SFD and CRC fields;
  a unit control data (UCD) field for system control data;
  a media data (MD) for media data; and
  a cyclic redundant code (CRC) for the CRC value of entire said frame ranging from said T/L field to said MD field.

2. The system as claimed in claim 1, wherein said monitor frame further comprises:
 a preamble (PRE) field for clock synchronization adjustment in said physical layer;
 a start of frame delimiter (SFD) field for the starting of said frame;
 a type/length (T/L) field for the type and the length of said frame excluding the PRE, SFD and CRC fields;
 a monitor control data (MCD) field for system monitor data; and
 a cyclic redundant code (CRC) for the CRC value of entire said frame ranging from said T/L field to said MCD field.

3. The system as claimed in claim 1, wherein said network card further comprises:
 physical layer transmission connection points (Port A, Port B);
 a digital media and control data input;
 a digital media and control data output;
 a digital media data transmission management, connected to said digital media and control data input;
 a control data transmission management, connected to said digital media and control data input;
 a digital media data receiving management, connected to said digital media and control data output;
 a control data receiving management, connected to said digital media and control data output;
 a frame compose management, connected to said digital media data transmission management and said control data transmission management;
 a frame decompose management, connected to digital media data receiving management and said control data receiving management;
 an output frame management, connected to said frame compose management;
 a receiving frame management, connected to said frame decompose management;
 two frame source output selections, connected to said output frame management;
 two frame input destination selections, connected to said receiving frame management;
 two transmitting media, connected respectively to said frame source output selections;
 two receiving media, connected respectively to said frame input destination selections;
 two physical layer transmitting interfaces, connected respectively to said transmitting media and said physical layer transmission connection point;
 two physical layer receiving interfaces, connected respectively to said receiving media and said physical layer transmission connection point; and
 a clock reconstitution module, for providing clocks to said frame compose management and said frame decompose management.

4. The system as claimed in claim 3, wherein said network card further comprises:
 a monitor transmitting management, connected between said digital media and control data input and said frame compose management; and
 a monitor receiving management, connected between said digital media and control data output and said frame decompose management.

* * * * *